United States Patent [19]

Fourie et al.

[11] Patent Number: 4,802,559
[45] Date of Patent: Feb. 7, 1989

[54] HYDROPNEUMATIC BRAKE ACTUATOR ARRANGED TO MAINTAIN A CONSTANT BRAKE SHOE CLEARANCE

[75] Inventors: Eugene Fourie, Brooklyn, South Africa; Steven C. Rumsey, Greer, S.C.

[73] Assignee: American Standard Inc., Spartanburg, S.C.

[21] Appl. No.: 151,738

[22] Filed: Feb. 3, 1988

[51] Int. Cl.$^4$ .............................................. F16D 65/72
[52] U.S. Cl. ........................... 188/196 A; 188/71.8; 188/153 R; 188/196 P; 188/198; 188/347; 188/79.51; 188/351; 92/13.1
[58] Field of Search ...... 188/351, 347, 348, 71.8–71.9, 188/72.4, 196 A, 196 C, 196 P, 198, 153 R, 153 D, 153 A, 79.5 R, 79.5 C, 79.51, 79.62, 79.54; 92/13.1, 13.5, 51, 52, 53, 60; 60/534, 543; 192/111 A

[56] References Cited

U.S. PATENT DOCUMENTS

| | | | |
|---|---|---|---|
| 2,952,338 | 9/1960 | Ostwalt | 188/351 |
| 3,125,187 | 3/1964 | Dotto | 188/351 |
| 3,421,604 | 1/1969 | Hobbs | 188/196 P X |
| 3,517,784 | 6/1970 | Clemmons | 188/198 X |
| 3,828,894 | 8/1974 | Crossman | 188/347 X |
| 3,837,443 | 9/1974 | Clemmons et al. | 188/198 X |
| 4,319,671 | 3/1982 | Smith et al. | 188/196 A |
| 4,323,144 | 4/1982 | Morris et al. | 188/196 A |
| 4,428,462 | 1/1984 | Warwick et al. | 188/347 X |
| 4,494,631 | 1/1985 | Billeter | 188/198 X |
| 4,496,033 | 1/1985 | Hall et al. | 188/348 X |

Primary Examiner—Douglas C. Butler
Attorney, Agent, or Firm—G. J. Falce

[57] ABSTRACT

A hydraulic power unit for a hydropneumatic brake actuator having a power piston comprising a force piston formed with a bore therein and a take-up piston operative in the force piston bore for movement relative thereto during a brake application. This relative movement is controlled by a check valve device carried with the force piston to establish or interrupt fluid pressure communication between the respective pistons and establishes a positive clearance between a brake shoe and wheel tread, for example, during a subsequent brake release.

6 Claims, 2 Drawing Sheets

HYDROPNEUMATIC BRAKE ACTUATOR ARRANGED TO MAINTAIN A CONSTANT BRAKE SHOE CLEARANCE

BACKGROUND OF THE INVENTION

The present invention relates to hydropneumatic actuator devices and particularly to brake actuators for railway vehicles operating in passenger transit service. These brake actuators may be either tread or disc brake units.

Typically, these brake units employ a light spring to bias the brake shoe into constant engagement with the wheel tread or disc during brake release, in order to generate, by friction, sufficient heat to prevent the accumulation of ice and snow on these brake parts during winter time and to assure a prompt response of the brakes. These so-called "zero-clearance" arrangements, in addition, offer the advantages of simple construction and accordingly low-cost manufacture.

Recent tests, however, have shown that the drag of the brake shoes during periods of brake release requires a considerable expenditure of train power, particularly where the train consists of more than one or two cars. With today's high cost of fuel, the consumption of power needed to overcome brake drag becomes increasingly critical and can offset any advantages heretofore realized.

Accordingly, "positive clearance" maintaining arrangements have been developed which typically employ friction elements to achieve the "positive clearance" operating characteristic. Typically, these friction elements consist of an aluminum split ring, which is designed to exert a radial force against the bore in which a power piston is operative to apply braking force. This principle of operation has not been completely successful, however, due to the rapid wear of the friction element itself and resultant bore damage.

SUMMARY OF THE INVENTION

The object of the present invention is to provide an improved hydropneumatic brake unit for railway brake apparatus having a simple, low-cost arrangement by which a constant brake shoe clearance is maintained throughout the range of brake shoe/wheel wear, without causing damage or excessive wear to the brake unit components.

This objective is achieved by providing a hydraulic brake actuator having a cylinder bore in which is disposed a force piston forming in cooperation with the cylinder bore a first fluid chamber, means for urging the force piston toward a brake release position, a bore in the force piston, a take-up piston operatively disposed in the force piston bore and forming in cooperation therewith a second chamber, the take-up piston being connected to brake means, a fluid flow path in the force piston between the first and second chambers via which hydraulic fluid supplied to the first chamber is connected to the face of the take-up piston to effect actuation thereof relative to the force piston until the brake means engages the surface to be braked, and check valve means in the flow path for interrupting fluid pressure communication between the first and second chambers in response to the supply of fluid pressure to the first chamber effecting movement of the force piston a predetermined distance relative to the take-up piston following engagement of the brake means with the surface to be braked.

BRIEF DESCRIPTION OF THE DRAWING

These objectives and other advantages of the invention will become apparent from the following more detailed explanation, when taken with the accompanying drawing in which.

DESCRIPTION AND OPERATION

Figure 1:
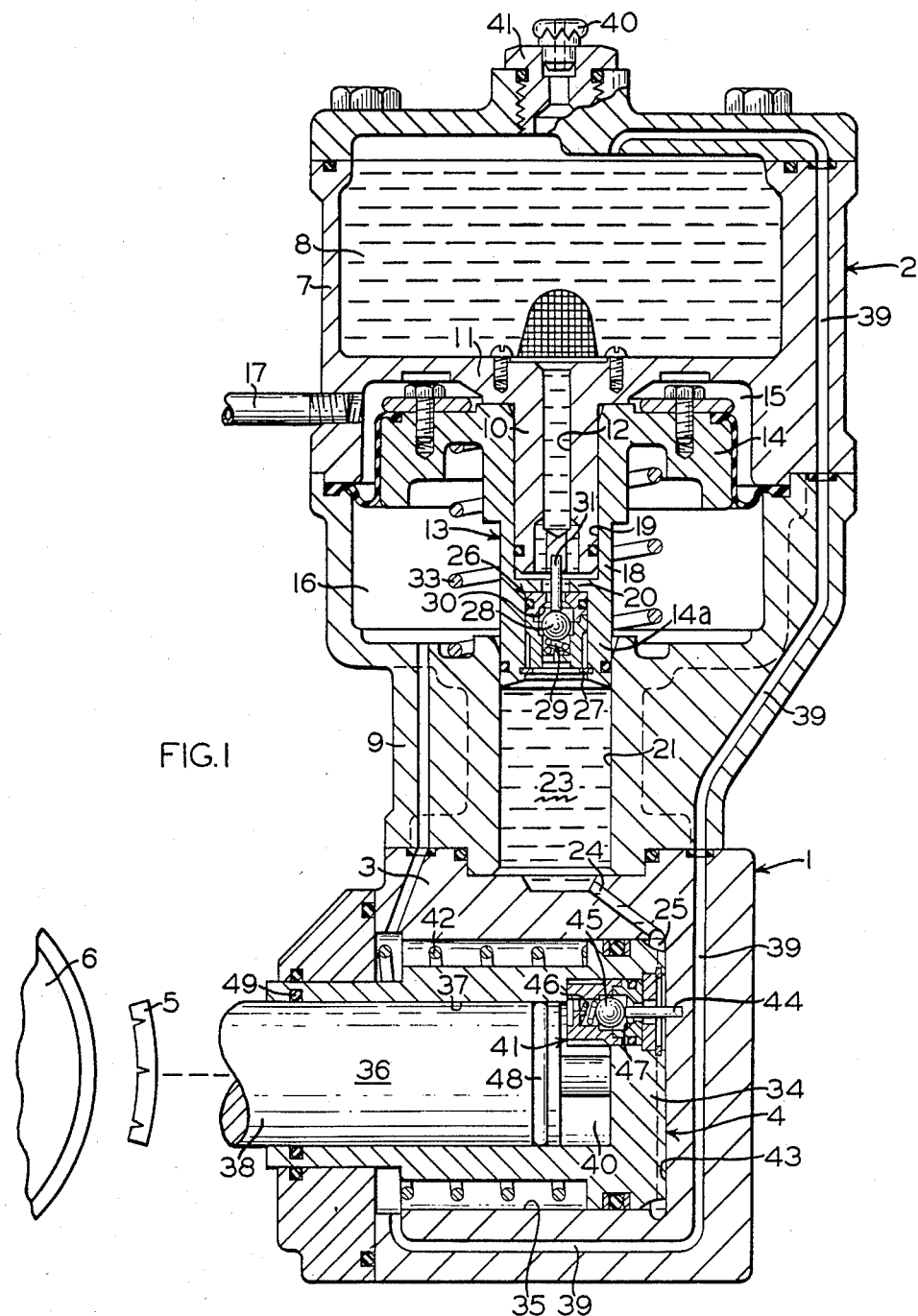
FIG. 1 is a sectional assembly view of a hydropneumatic brake actuator incorporating the present invention.
Figure 4:
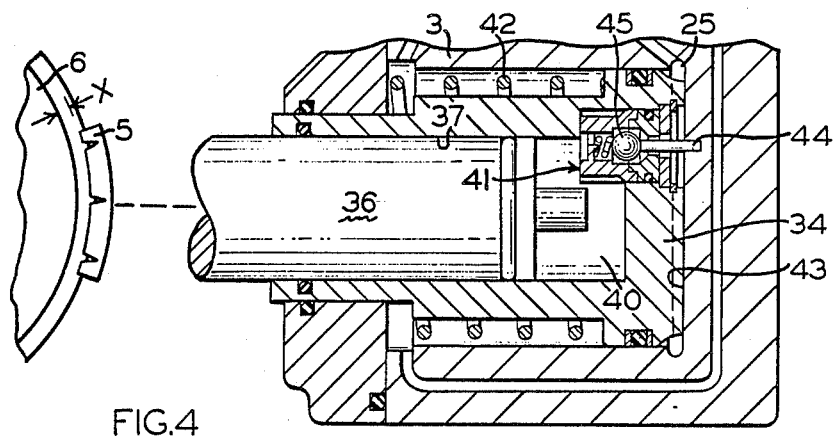

The brake unit embodying the present invention, as shown in FIG. 1, comprises a force actuator portion 1 and a hydropneumatic converter portion 2. The force actuator portion 1 includes a power cylinder 3 in which a power piston 4 is coaxially disposed for operation between a fully retracted or brake release position, and an applied position. In brake release position of piston 4, a brake shoe 5 suitably mounted in a conventional manner to piston 4, is retracted a predetermined distance from the tread of a wheel 6 of a railway vehicle on which the brake unit may be mounted. A positive clearance between brake shoe 5 and the wheel tread 6, as shown in FIG. 4, is maintained constant over the wear life of the shoe and wheel tread, in accordance with the teachings of the present invention.

The hydropneumatic converter portion 2 is mounted to force actuator portion 1 in a vertical dispostion relative thereto. Converter portion 2 includes an upper casing section 7 in which is formed a hydraulic reservoir 8, and a lower casing section 9 to which force actuator portion 1 is connected. Upper casing section 7 also forms a vertical guideway 10 that extends downwardly from a wall 11 forming the bottom of reservoir 8 toward casing section 9. A coaxial passage 12 in guideway 10 extends therethrough, so as to open at its upper end into reservoir 8.

A hydropneumatic converter unit 13 comprising an integral pneumatic control piston 14 and a hydraulic input piston 14a is arranged to operate vertically in converter portion 2 by telescopic-like operation on guideway 10, as hereinafter explained. Pneumatic control piston 14 is the diaphragm-type, the outer periphery of the piston diaphragm being sealingly clamped between the two casing sections 7 and 9. Pneumatic control piston 14, in cooperation with that portion of upper casing section 7 below separating wall 12, forms a pneumatic pressure control chamber 15 adjacent the upper side of control piston 14. Formed below control piston 14 within lower casing section 9 is a spring chamber 16. Chamber 15 is connected via a supply pipie 17 to a source of pneumatic control pressure, and spring chamber 16 is vented to atmosphere via a fluid leakage recycling passage 39, that leads back to hydraulic reservoir 8 and a vented plug 40 of a fluid refill cap 41.

Projecting from the underside of piston 14 is a coaxial guide stem 18, the face of which forms hydraulic input piston 14a. Guide stem 18 is formed with a bore 19 extending therethrough and having a reduced diameter section 20 at approximately the axial midpoint of the bore 19, to divide the bore into upper and lower portions. The upper portion of piston bore 19 is sealingly mounted on guideway 10 to accommodate reciprocal movement of converter unit 13.

Input piston 14a is sealingly-disposed in a cylinder bore 21 formed in lower casing section 9. Bore 21, along with hydraulic input piston 14a and the portion 1, to which the converter portion 2 is mounted, define a hydraulic pressure chamber 23 into which the lower portion of bore 19 of guide stem 18 opens. Hydraulic chamber 23 is connected by a passage 24 to a chamber 25 in power cylinder 3 of force actuator portion 1.

Disposed in the lower portion of bore 19 of guide stem 18 is a cartridge-type check valve device 26 that is held in position against reduced diameter section 20 by a retainer ring 27. The check valve device comprises a ball valve 28 that is biased by a light spring 29 toward engagement with a tapered, annular seat 30. A spacer pin 31 integral with the bottom of guideway 10 projects through the reduced diameter section 20 of bore 19 and through an opening in the top of check valve cartridge 26 to engage and unseat ball valve 28, when control piston 14 is fully retracted by a release spring 33 in chamber 16.

Power piston 4 consists of a force piston 34 that is operatively-disposed in a cylinder bore 35 of power cylinder 3, and a take-up piston 36 that is telescopically-disposed in a central bore 37 of force piston 34. The tail 38 of take-up piston 36 is suitably connected to brake shoe 5 via a brake hanger or the like (not shown). Formed between the face of take-up piston 36 and the bottom of bore 37 is a fluid pressure chamber 40. Chamber 25 formed between the face of force piston 34 and the bottom of bore 35 is communicated with chamber 40 via a cartridge-type check valve device 41 carried in the head of force piston 34. A return spring 42 is arranged in the bore 35 of power cylinder 3 to urge the head of force piston 34 into engagement with an end wall 43 forming the bottom of bore 35. Projecting into bore 35 from end wall 43 is a pin 44 that is engageable with a ball valve 45 of check valve device 41. A light bias spring 46 urges ball valve 45 toward seating engagement with a tapered valve seat 46 formed in the cartridge body of check valve device 41. In the fully retracted and/or release position of power piston 4, in which force piston 34 is forced by spring 42 into engagement with end wall 43, ball valve 45 is forced off its seat 46 by engagement with pin 44, thereby opening a central flow path in the cartridge body of check valve device 41 to provide the fluid pressure communication between chambers 25 and 40. A pair of conventional elastic seal rings 48 and 49 are provided to isolate pressure chamber 40 from atmosphere and to provide a friction force between pistons 34 and 36.

Referring to FIG. 1, the brake unit is shown in a fully retracted position in which servicing of the brake shoes is facilitated. When a brake application is initiated from this fully retracted brake shoe position or from a predetermined positive brake shoe clearance that is maintained constant in accordance with the present invention, pneumatic pressure chamber 15 is supplied with pneumatic control pressure commensurate with the degree of brake force desired, the manner in which this pneumatic control pressure is supplied being conventional and well known, and thus not deemed necessary for an understanding of the invention. With the face of pneumatic control piston 14 subjected to this pneumatic control pressure supplied to chamber 15, converter unit 13 is moved downwardly against the opposing force of spring 33. Cartridge 26 is carried with converter unit 13, moving ball valve 28 away from engagement with spacer pin 31. This allows the ball valve to be force into engagement with its seat 30 by spring 29, thereby interrupting fluid pressure communication between hydraulic reservoir 8 and hydraulic chamber 23 via passage 12. With ball valve 28 thus closed, the force of pneumatic pressure acting on the upper side of control piston 14 is transmitted via hydraulic input piston 14a to the hydraulic fluid trapped in hydraulic chamber 23 and thereby converted to hydraulic force. Because the effective pressure area of the upper surface of control piston 14 is much greater relative to the effective areea of hydraulic input piston 14a, the force transmitted to the hydraulic fluid in chamber 23, and thus to chamber 25, is multiplied according to the relative areas of the respective pistons.

Figure 2:
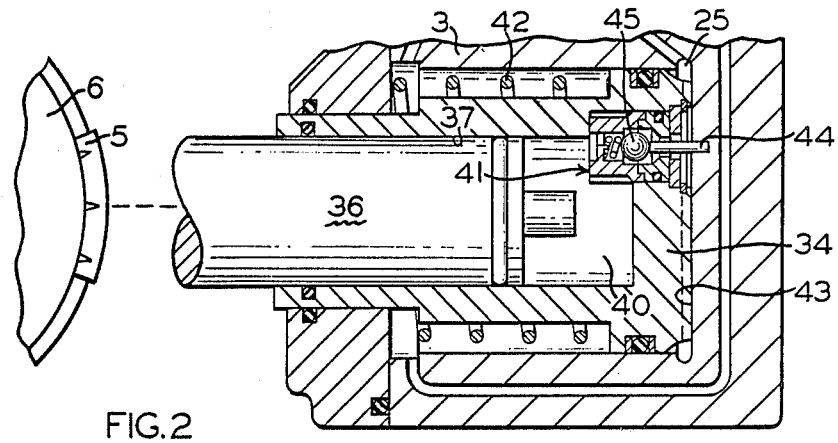
FIGS. 2, 3, and 4 are partial, sectional assembly views of the brake actuator in different positions of operation.

The hydraulic pressure effective in chamber 25 acts on the face of force piston 34 and is connected via check valve device 41 to chamber 40 where it acts on the face of take-up piston 36. Since brake shoe 5 is displaced from wheel tread 6 in the fully retracted position shown in FIG. 1, take-up piston 36 is free to move in a leftward direction in response to the build-up of fluid pressure in chamber 40 during the preliminary phase of a brake application. During this movement of take-up piston 36 prior to engagement of brake shoe 5 with wheel tread 6, insufficient buildup of hydraulic pressure occurs in chamber 25 to activate piston 34 against the force of spring 42, due to the volumetric expansion of chamber 40 corresponding to the volumetric reduction of chamber 25. It will be understood that the force of hydraulic pressure is sufficient, however, to actuate take-up piston 36 against the seal ring friction between the respective piston and that spring 42 exerts sufficient axial force to oppose the pressure imbalance between atmosphere and hydraulic chamber 25. Force piston 34 thus remains in its release position 42 until brake shoe 5 engages wheel tread 6, as shown in FIG. 2.

Figure 3:
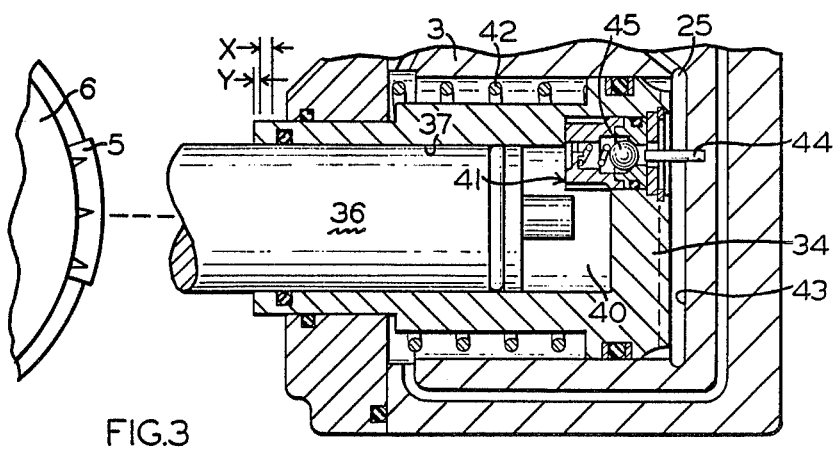

When this occurs, movement of take-up piston 36 is arrested, so that no further volumetric expansion of chamber 40 occurs. Consequently, continued movement of input piston 14a during the final phase of the brake application increases the hydraulic pressure in chamber 25 acting on force piston 34 sufficient to overcome the force of return spring 42, to thereby cause force piston 34 to move in a leftward direction relative to take-up piston 36. In that cartridge-type check valve device 41 is carried by force piston 34, valve seat 47 engages ball valve 45, which is biased by spring 46 against pin 44, following movement of force piston 34 from its release position against end wall 43 through a distance X. As will hereinafter be explained, this distance X establishes the "positive clearance" maintained between brake shoe 5 and wheel tread 6 during each brake release. This seating of ball valve 45 effects closure of check valve device 41 and thus interrupts the flow path between chambers 25 and 40 to thereby trap hydraulic fluid in chamber 40. Following closure of check valve device 41, therefore, the hydraulic force acting across the face of the larger force piston 34 is transferred to take-up piston 36 to apply braking force to the brake shoe 5. As this breaking force increases, the seated ball valve 45 is moved away from pin 44 a distance Y corresponding to brake shoe flexure and/or wheel axle bearing deflection according to the effective brake force, as shown in FIG. 3.

During a subsequent release of the brakes, as by venting the pneumatic control pressure effective in chamber 15, to allow return spring 33 to retract control/input piston 14, 14a of converter unit 13, the hydraulic brake pressure in chamber 23 and effective on the face of force piston 34 is also relieved, thus allowing return spring 42 to move force piston 34 in a rightward direction. This initial return stroke of force piston 34 during the preliminary phase of brake release continues until ball valve 45 is moved back into engagement with pin 44, such movement corresponding to distance Y. The aforementioned brake shoe flexure and/or wheel axle bearing deflection will cause take-up piston 36 to move in a rightward direction with force piston 34 through this distance Y, but without brake shoe 5 becoming disengaged from wheel tread 6, because this movement of piston 34 through distance Y is simply the return of stroke resulting from brake shoe flexure and/or wheel axle bearing deflection during application of braking force.

Following this preliminary phase of brake release, continued retraction of force piston 34 by spring 42 causes valve seat 47 of check valve device 41 to become disengaged from ball valve 45, which is held against movement with the check valve body by its return engagement with pin 44. During this final phase of brake release, check valve device 41 is open, thereby communicating chambers 25 and 40. The take-up piston 36 is held in place relative to piston 34 by seal rings 48, 49 and, consequently, take-up piston 36 is retracted to brake release position jointly with force piston 34 as combined volume 25 and 40 decreases and volume 23 increases. This joint movement of pistons 34 and 36 in a rightward direction continues until force piston 34 contacts end wall 43, thereby terminating further retraction of brake shoe 5 from wheel tread 6, as shown in FIG. 4. This establishes a positive clearance between the brake shoe and wheel tread corresponding to distance X during each brake release cycle of operation. In that this distance X first corresponds to the movement of take-up piston 36 to contact wheel 6, a subsequent pressure increase and movement of force piston 34 a distance "X" leftward relative to now stationary take-up piston 34 are required before valve seat 47 becomes engaged with ball valve 45 during the brake application stroke. It will be appreciated that distance X and thus the positive brake shoe clearance dimension can be adjusted by changing the distance that pin 44 projects into chamber 25.

In the event overtravel of the converter portion piston 14, 14a has occurred dur to brake shoe/wheel wear during a brake application, piston 14, 14a will not be in its fully released position when movement of force piston 34 is terminated by its engagement with end wall 43. Consequently, continued movement of piston 14, 14a to release position a distance corresponding to the piston overtravel results in further volumetric expansion of chambers 23, 25, and 40. Since the position of force piston 34 is fixed by engagement with end wall 43, and the position of take-up piston 36 is fixed relative to piston 34 by the friction force of seal rings 49 and 48, a negative pressure or suction force will occur at ball valve 28 of check valve device 26 sufficient to overcome its bias spring 29 and accordingly disengage the ball valve from its seat 30. This opens a flow path in the check valve device via which make-up hydraulic fluid is supplied to converter chamber 23 from reservoir 8 according to the piston overtravel due to brake shoe/wheel wear. It will be appreciated that a negative pressure or suction force also acts on the face of take-up piston 36. Due to the dual piston arrangement comprising power piston 4, however, the pressure area of take-up piston 36 is relatively small and accordingly the conventional-type elastic seal rings 48 and 49 have been found to provide sufficient friction between take-up piston 36 and force piston 34 to counteract the negative pressure or suction force that would otherwise draw take-up piston 36 in a rightward direction relative to force piston 34, without requiring any special supplemental friction-type member, as required in previous designs. Accordingly, less wear of the respective components is realized, thus extending the service life of the brake unit embodied in the present invention. Moreover, the "positive clearance" dimension X between brake shoe 5 and wheel tread 6 is established during each brake release, and maintained during slack take-up.

We claim:

1. A hydraulic brake actuator for operating brake means relative to a member to be braked comprising:
   (a) a cylinder body having a bore therein terminating in an end wall;
   (b) a force piston operatively-disposed in said cylinder bore and forming, in cooperation therewith, a first chamber;
   (c) means for yieldably exerting a force on said force piston to urge movement thereof to a brake release position in which said force piston is engageable with said end wall of said cylinder bore;
   (d) a bore in said force piston;
   (e) a take-up piston operatively-disposed in said force piston bore and cooperating therewith to provide a second chamber, said take-up piston being connected to said brake means;
   (f) a fluid flow path in said force piston interconnecting said first and second chambers, said take-up piston being movable in a brake application direction relative to said force piston in response to the supply of fluid under pressure to said first and second chambers, said movement of said take-up piston effecting such volumetric expansion of said first and second chambers as to prevent the fluid pressure force acting on said force piston from exceeding said yieldable force, thereby preventing actuation of said force piston from said release position until said movement of said take-up piston is arrested;
   (g) check valve means for controlling fluid pressure communication between said first and second chambers comprising:
      (i) a valve seat formed in said force piston in surrounding relationship with said flow path;
      (ii) a valve member cooperatively arranged relative to said valve seat;
      (iii) a pin fixed to said end wall so as to project into said flow path and displace said valve member from said valve seat a predetermined distance in said release position of said force piston, whereby fluid pressure communication is established between said first and second chambers during said movement of said take-up piston in said brake application direction relative to said force piston;
      (iv) a bias spring acting on said valve member in a direction urging engagement of said valve member with said valve seat, whereby said fluid pressure communication between said first and second chambers is interrupted in response to said actuation of said force piston and distance corresponding to said predetermined distance; and (h) friction means for exerting a friction force between said force piston and said take-up piston to prevent relative movement therebetween during said movement of said force piston to said release position, whereby said brake means is retracted from said member to be braked at least said predetermined distance to provide positive clearance therebetween.

2. A hydraulic brake actuator, as recited in claim 1, wherein said friction means comprises at least one fluid pressure seal ring carried by one of said force piston and said take-up piston.

3. A hydraulic brake actuator, as recited in claim 2, said yieldable force means being a return spring having a force selected to resist said actuation of said force piston in response to the fluid pressure required in said first and second chambers to overcome said friction force of said at least one seal ring during movement of said take-up piston in said brake application direction.

4. A hydraulic brake actuator, as recited in claim 3, wherein said fluid under pressure supplied to said first and second chambers is hydraulic fluid.

5. A hydraulic brake actuator, as recited in claim 1, further comprising hydraulic slack adjuster means for establishing a negative pressure in said first chamber following movement of said force piston to said release position, provided said force piston, during a preceding movement thereof to said application position, overtravels said predetermined distance, whereby make-up hydraulic fluid is supplied to said first chamber to compensate the volumetric increase thereof due to said overtravel.

6. A hydraulic brake actuator, as recited in claim 5, wherein said friction force exerted by said friction means is greater than the force acting on said take-up piston in response to said negative pressure.

* * * * *